United States Patent
Weiberle et al.

(10) Patent No.: US 6,256,570 B1
(45) Date of Patent: Jul. 3, 2001

(54) ELECTRICAL BRAKING SYSTEM FOR A MOTOR VEHICLE

(75) Inventors: Reinhard Weiberle, Vaihingen/Enz; Peter Blessing, Heilbronn, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/327,120

(22) Filed: Jun. 7, 1999

(30) Foreign Application Priority Data

Jun. 12, 1998 (DE) .............................. 198 26 132

(51) Int. Cl.$^7$ ................ G06F 7/70; G06G 7/76
(52) U.S. Cl. .............. 701/70; 701/78; 701/81; 188/171; 188/170; 303/7; 303/15; 303/155
(58) Field of Search ................... 701/70, 71, 78, 701/74, 83; 318/139, 362, 370, 368, 369, 108, 440; 180/65.3, 65.4; 303/113.4, 155, 20, 146, 181, 122, 11, 7, 9, 13, 3, 5, 15; 188/138, 156, 161, 164

(56) References Cited

U.S. PATENT DOCUMENTS

| | | | |
|---|---|---|---|
| 4,462,487 | * 7/1984 | Warwick et al. | 192/219.7 |
| 4,553,650 | * 11/1985 | Warwick et al. | 192/219.7 |
| 4,877,294 | * 10/1989 | Kuhn et al. | 303/9 |
| 5,180,038 | * 1/1993 | Arnold et al. | 188/171 |
| 5,190,357 | * 3/1993 | Goldfein | 303/7 |
| 5,310,251 | * 5/1994 | Towers et al. | 303/11 |
| 5,752,748 | * 5/1998 | Schramm et al. | 303/20 |
| 5,791,750 | * 8/1998 | Spiegelberg | 303/191 |
| 5,952,799 | * 9/1999 | Maisch et al. | 318/362 |
| 5,954,407 | * 9/1999 | Scramm et al. | 303/155 |
| 5,962,997 | * 10/1999 | Maisch | 303/108 |
| 6,008,604 | * 12/1999 | Maisch | 318/362 |
| 6,015,194 | * 1/2000 | Decker | 303/155 |
| 6,081,081 | * 6/2000 | Maisch | 318/139 |

FOREIGN PATENT DOCUMENTS

| | | |
|---|---|---|
| 34 44 301 | 6/1986 | (DE) . |
| 196 33 835 | 2/1998 | (DE) . |
| 196 34 567 | 3/1998 | (DE) . |
| 63-154453 | 6/1988 | (JP) . |
| 08048222 | 2/1996 | (JP) . |
| 09030396 | 2/1997 | (JP) . |
| 09076900 | 3/1997 | (JP) . |
| 11-255086 | 9/1999 | (JP) . |

* cited by examiner

Primary Examiner—Jacques H. Louis-Jacques
(74) Attorney, Agent, or Firm—Kenyon & Kenyon (57) ABSTRACT

An electrical braking system for a motor vehicle has a controller which detects the actuation of a service-brake operator element, determines therefrom at least one driver's braking input for the brake control, and supplies this set point value to control units for controlling the wheel brakes. This controller also detects the actuation of a parking-brake operator element, determines therefrom a parking-brake input of the driver, and links this parking-brake input with the braking input for the service brake to form the total braking input. An electrical braking system for a motor vehicle includes at least one control unit which is allocated to at least one wheel brake. The controller controls an actuator for actuating the wheel brake on the basis of a setpoint value. The actuator has an electric motor and a locking device, in particular, a disengaging device. To actuate the wheel brake via the electric motor, the locking device is released. After the actuation has terminated, the locking device is again closed. A further controller for a different wheel brake is supplied with energy from a different energy-supply system. It activates an additional resetting possibility in the actuator in the event of a fault.

10 Claims, 8 Drawing Sheets

FIG. 8

ELECTRICAL BRAKING SYSTEM FOR A MOTOR VEHICLE

FIELD OF THE INVENTION

A decentralized electrical braking system (e.g., brake by wire) for a motor vehicle which, due to its decentralized configuration, is capable of meeting high technical demands with respect to safety and availability.

BACKGROUND INFORMATION

A conventional braking system is described in German Patent Application No. 196 34 567. This conventional braking system has a decentralized structure in which a pedal unit for forming the command variables, which are a function of the driver's input, optionally a processing unit for the consideration of additional functions, as well as wheel-pair units for the open-loop or closed-loop control of the final controlling elements of the wheel brakes are connected via one or a plurality of communication systems. Furthermore, the braking system is supplied with energy from at least two vehicle electrical systems. In this manner, satisfactory reliability and availability of the braking system is ensured. A "pedal unit" forms setpoint values for the brake control in response to a service braking. An inclusion of a parking brake function is not described.

One of the objects of the present invention is to specify measures for the incorporation of a parking brake function into a decentralized braking system.

SUMMARY OF THE INVENTION

An incorporation of a parking-brake function into a decentralized braking system is possible using the electrical braking system according to the present invention.

In so doing, it is advantageous that the necessary operational reliability and availability are also ensured with respect to the parking brake. For example, the functional reliability of the unit evaluating the driver's braking inputs is verified without great expenditure for hardware.

Furthermore, the parking-brake input and the service-brake input of the driver are advantageously coordinated with one another.

DETAILED DESCRIPTION

An open-loop or closed-loop control of the service-brake and parking-brake function of the braking system of a motor vehicle is described below. Due to the decentralized distribution of the braking system and the redundancies provided in the system, in the event of static and dynamic faults, the braking functionality is maintained to a high degree, and the operational reliability of the braking system is ensured. In addition, fault conditions are stored for service purposes and signaled, if necessary. The abbreviations for components and signals, which are described below and shown in the Figures, are provided in the Appendix.

Figure 1:
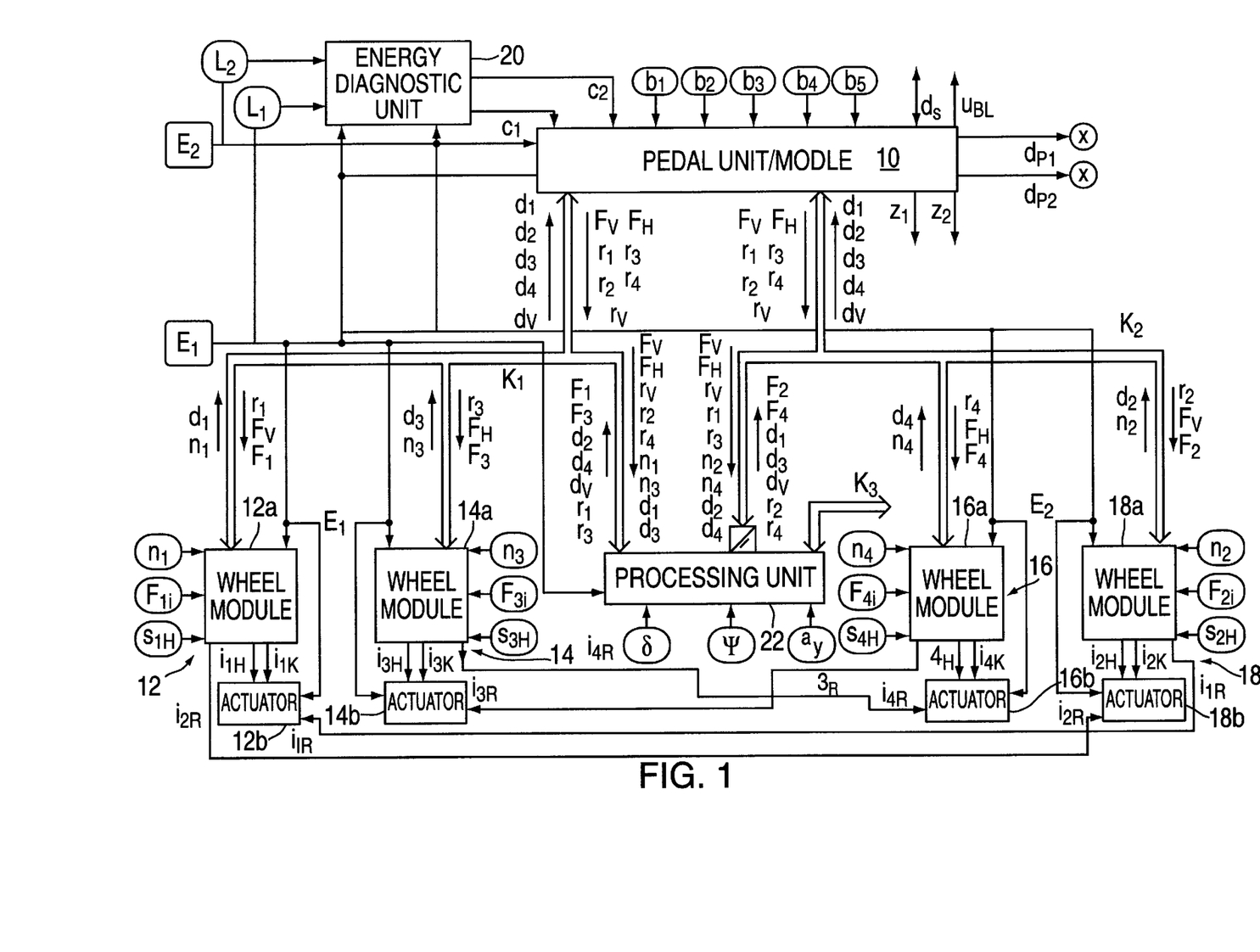
FIG. 1 shows a first exemplary embodiment of an electromechanical braking system according to the present invention.

FIG. 1 shows a first exemplary embodiment of an electromechanical braking system according to the present invention, and the respective signals exchanged. The system has a decentralized structure which results from the system components, and includes a pedal unit 10, four wheel units 12, 14, 16 and 18, an energy diagnostic unit 20 and a processing unit 22.

Pedal module (unit) 10 of the electromechanical braking system is primarily responsible for detecting the driver's braking input, analyzing the overall system condition and initiating fallback strategies in a fault situation.

Each wheel unit (12, 14, 16, 18) is composed of a wheel module (12a, 14a, 16a, 18a), the wheel sensors (e.g., for example, n1, F1i, s1H, etc.) and an actuator (12b, 14b, 16b, 18b). Each wheel module (12a, 14a, 16a, 18a) includes a microcomputer system, a monitoring component, and the power electronics for driving the actuator.

The electric power for the electrical system is supplied via the two independent vehicle electrical systems $E_1$ and $E_2$. Two wheel units are supplied from the same energy source. In the system structure shown in FIG. 1, a diagonal distribution is assumed, i.e. wheel units (12, 14) for the left front and right rear wheels are supplied from a shared energy source $E_1$ The same holds true for wheel units (16, 18) for the right front and left rear wheels, which are supplied from energy source $E_2$. Another embodiment in which the two wheel units of one axle are in each case allocated to one energy source is likewise possible. This embodiment will not be discussed further below. The following described procedures are likewise used for this distribution with the corresponding advantages. The wheel units are arranged near the respective wheel brake, while the pedal unit and processing unit 22 are mounted together or separately at a more central location.

Data is exchanged between the individual components of the braking system with the assistance of two independent communication devices $K_1$ and $K_2$, which are preferably implemented as serial bus systems, e.g., CAN. Communication devices $K_1$ and $K_2$ are powered by the different vehicle electrical systems. In addition, the connection to the control unit of the engine management system is implemented by a communication system $K_3$.

In each wheel module, the activation of the associated actuator is implemented for adjusting the desired application force or the desired braking torque. For this purpose, the wheel application force or the wheel braking torque is alternatively detected in each actuator by sensors. The electromechanical actuator acts via a gear stage on the brake application stroke of disc or drum brakes without a hydraulic intermediate stage. To this end, the wheel unit controls the application force or the braking torque for the individual wheel. The necessary command variable is preselected by way of the allocated bus system.

In one exemplary embodiment, actuator (12b, 14b, 16b, 18b) of a wheel unit also includes an electromagnetically vented disengaging (release) device (control via i1K, i2K, i3K, i4K), which, on one hand, performs the parking-brake function, and in addition, during steady-state braking phases, retains the braking system in the prevailing position without energy consumption. In addition, integrated in actuator (12b, 14b, 16b, 18b) of each wheel is a resetting (return) device (control via i1R, i2R, i3R, i4R) which, in response to all types of faults that would prevent the brakes of a wheel from releasing, isolates the wheel in question. In order to be able to manage these types of faults even when an energy diagnostic unit (20) is malfunctioning, the resetting device is activated by the adjacent wheel unit of the same axle (e.g. for 12b from 18a). In the diagonal distribution of the energy circuits under discussion, the two wheel units of an axle are preferably supplied from different energy sources. Because of this, in the event of failure of an energy source, in any state, at least a release of the affected actuator can be achieved by the resetting device.

Energy diagnostic module (20) ascertains the state of charge of the energy supply units and transmits this information ($c_1$, $c_2$) to pedal module (10).

A detailed description of the functions and of the structure of the system components of the electromechanical braking system is described below, with reference to FIGS. 2 through 5.

Figure 2:
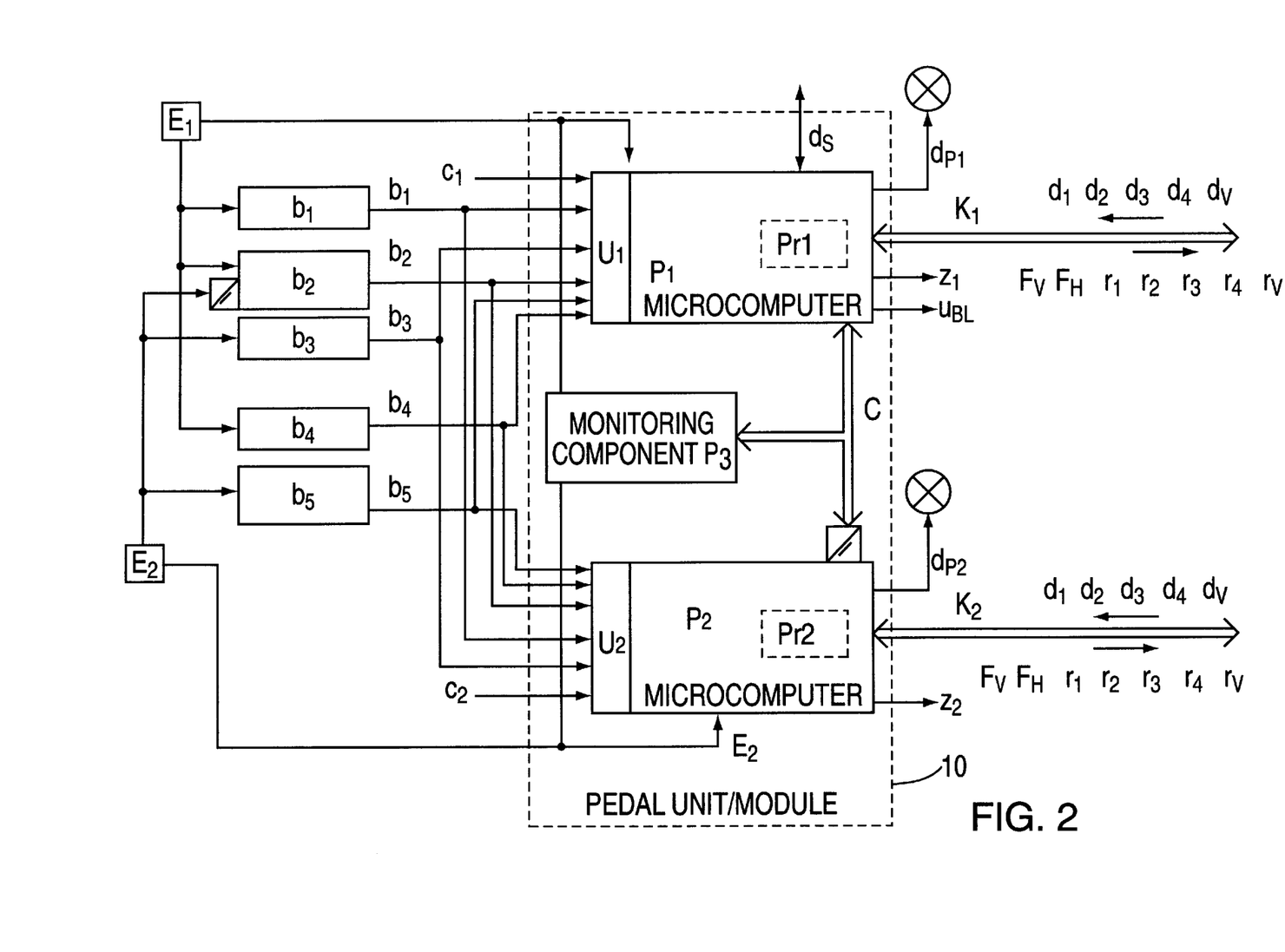
FIG. 2 shows an exemplary structure of a pedal unit.

FIG. 2 shows an exemplary embodiment of pedal module (10).

The tasks of this system component are to detect the driver's braking input, and specifically with respect to the service brake and the parking brake, and to form the requisite command variables for the wheels of the front and rear axles; to acquire and evaluate the status messages of all system components of the electromechanical braking system; to analyze the prevailing overall condition of the braking system, optionally initiating fallback measures and signaling the fault condition to the driver or storing it within a fault storage means; to initialize all components of the braking system after the ignition is switched on or in response to the actuation of the brake while the ignition is switched off; to deactivate the braking system after travel has terminated; and to activate the brake light.

The driver's input for a service braking is detected by independent sensors $b_1$, $b_2$ and $b_3$, which preferably detect the analog driver input (brake-pedal angle and/or the force of the actuation) at the brake pedal. The sensors are powered by the different energy supplies $E_1$ and $E_2$, respectively, i.e. sensors $b_1$ and $b_2$ by energy supply $E_1$ and sensors $b_2$ and $b_3$ by energy supply $E_2$. The driver input of a parking-brake actuation is detected by way of sensors $b_4$ and $b_5$ (likewise, e.g. by detecting the deflection of the parking-brake lever), which are powered by the different energy supplies. One analog sensor each for detecting the service-braking input as well as the parking-brake input could also be replaced by a binary detector (e.g. a transducer).

Pedal module 10 has a fault-tolerant construction, e.g. by implementation using a redundant microcomputer system composed of microcomputers $P_1$ and $P_2$, which in addition includes the necessary interface, storage and watchdog modules, and a monitoring component $P_3$. Microcomputers $P_1$ and $P_2$ as well as monitoring component $P_3$ communicate via internal communication channel C which, for example, is implemented by a serial bus system or with serial interfaces. Independent programs Pr1 and Pr2 are implemented within microcomputer systems $P_1$ and $P_2$. Using computer program Pr1, sensor signals $b_1$ through $b_5$ are acquired via input interface $U_1$, stored, and made available to microcomputer $P_2$ via communication channel C. In corresponding manner, using computer program Pr2, sensors signals $b_1$ through $b_5$ are acquired via input interface $U_2$, stored, and transmitted to microcomputer $P_1$. Therefore, 6 measured values of the driver's input for service braking and 4 measured values of the driver's input for a parking-brake actuation are available within both computers.

From the measured values for the service braking, a representative signal value for the service-brake input $b_{B,rep}$ is determined in microcomputers $P_2$ and $P_2$, in each case by majority selection. This is effected while weighting possible individual errors, in that the individual measured values which differ over and above a certain degree from the others are not utilized for forming the reference values. The reference values calculated in microcomputers $P_1$ and $P_2$ are designated by $b_{B,rep,1}$ and $b_{B,rep,2}$, respectively. If reference value $b_{B,rep,1}$ exceeds a predefined limiting value, then the brake light is activated by signal $U_{BL}$.

Representative signal values are likewise calculated in both microcomputers from the measured values of the driver's input for the parking-brake actuation. The representative signal values ascertained in microcomputers $P_1$ and $P_2$ are designated by $b_{F,rep,1}$ and $b_{F,rep,2}$, respectively. When the passenger car is stationary (which, e.g. is determined by evaluating one or a plurality of wheel-speed signals), these representative signal values are the maximum values of the measured sensor signals $b_4$ and $b_5$, and when the passenger car is in motion, i.e. not stationary, are the minimum values of these two sensor signals.

From reference values $b_{B,rep,1}$ and $b_{B,rep,2}$, the respective command variable for the desired average application force or the desired average braking torque of a wheel during a service braking is calculated in both microcomputers, using a stored pedal characteristic. This command variable is designated in microcomputer $P_1$ by $F_{B,res,1}$ and in microcomputer $P_2$ by $F_{B,res,2}$.

Utilizing a pre-definable stored characteristic, the driver's input for the average application force or the average braking torque of a wheel during a parking braking is likewise ascertained in microcomputers $P_1$ and $P_2$ from sensor signals $b_{F,rep,1}$ and $b_{F,rep,2}$. This command variable is designated in microcomputer $P_1$ by $F_{F,res,1}$ and in microcomputer $P_2$ by $F_{F,res,2}$.

The command variables for the service brake input and the parking brake input calculated in one microcomputer are made available to the respective other microcomputer via internal communication channel C. In both microcomputers, $F_{B,res,1}$ is compared to $F_{B,res,2}$ and $F_{F,res,1}$ is compared to $F_{F,res,2}$. If the comparison values agree in each case within a pre-definable tolerance limit, then a resulting variable is formed for service-brake input FB,res by the arithmetic mean from variables $F_{B,res,1}$ and $F_{B,res,2}$, and the resulting variable for parking-brake input $F_{F,res}$ is formed by the arithmetic mean of variables $F_{F,res,1}$ and $F_{F,res,2}$.

If the comparison values do not agree, then the error-free signal values both for the service-brake input and for the parking-brake input are clearly detected by monitoring component $P_3$ on the basis of the computer monitoring system described below. In both microcomputers, the error-free signal values are allocated to variables $F_{B,res}$ and $F_{F,res}$, respectively.

The resulting average application force of a wheel $F_{res}$ is formed from signals $F_{B,res}$ and $F_{F,res}$ using the equation $F_{res}$=maximum ($F_{B,res}$, $F_{F,res}$). In an alternative embodiment, $F_{res}$ could also correspond to the resulting average braking torque of a wheel which is demanded by an actuation of the service or parking brake. The desired application forces or braking torques for the wheels of the front axle $F_v$ and for the wheels of the rear axle $F_H$ are calculated from $F_{res}$ along the lines of a suitable distribution.

Using communication systems $K_1$ and $K_2$, the pedal module transmits the setpoint values for the application forces and braking torques $F_v$ and $F_H$ to the connected components of the electromechanical braking system.

Due to the diverse acquisition and calculation, errors which would lead to an unintentional braking or a false command variable for the wheel application force or the wheel braking torque are recognized. Corrupt memory contents, which would result in a similar faulty action, are detected as well. Monitoring component $P_3$ communicates with microcomputers $P_1$ and $P_2$, respectively, via internal bus system C. The monitoring component is used for monitoring the program runs in programs Pr1 and Pr2, and in addition, for checking the computing reliability of microcomputers $P_1$ and $P_2$. In order to ensure safety in the event of a computer error in $P_1$ or $P_2$, in this fault situation, programs Pr1 and Pr2 must nevertheless still run properly, or the run which is not proper must be reliably recognized. In response to a run which is not proper, the associated computer channel is deactivated and an error is signaled by way of signals $d_{p1}$ and $d_{p2}$, respectively. In the embodiment shown, the control of the performance reliability is effected by a query-response communication. Microcomputers $P_1$ and $P_2$ collect a query from monitoring component $P_3$ and respond to it within a predefined time interval, in each case taking into account all safety-relevant program sections. The queries are preselected in such a way that a correct response is only given if these program sections, in particular the computer functional performance tests (RAM test, ROM test, etc.) and the command tests (with respect to addition, subtraction, etc.) are executing correctly. The partial responses formed from the partial programs are combined in each microcomputer to form a complete response. The respective complete responses provided by microcomputers $P_1$ and $P_2$ are checked in the monitoring component with respect to the time interval of arrival and for the bit-for-bit agreement with the correct response matching the query and, if applicable, strategies for mastering the error such as signaling and channel deactivation are initiated. The performance reliability of the monitoring component is checked by microcomputers $P_1$ and $P_2$ using suitable test queries. These test queries can only be answered correctly by the monitoring component if it is functioning completely correctly.

In addition, the internal error states and error signal messages $d_1$, $d_2$, $d_3$ and $d_4$ of the connected wheel units and error message $d_v$ of the processing unit are acquired in the pedal module and stored in a fault storage means. Status signals $c_1$ and $c_2$ of the energy diagnostic unit are also acquired. This acquisition takes place both during a test phase before the vehicle begins to move, as well as during all vehicle operating phases. All error and status signals are evaluated within the pedal module, using preselected tables in which an action to be carried out for each type of error and for each status is stored. As a result of the evaluation, while the vehicle is in operation, messages for fallback strategies corresponding to the danger potential of the error states are introduced in the various components of the braking system which are transmitted to the processing unit and the wheel units by signals $r_1$, $r_2$, $r_3$, $r_4$, and $r_v$. In the case of safety-relevant errors, the driver is signaled by error signals $d_{P1}$ and $d_{P2}$, respectively. In the case of error states which are detected in the test phase before vehicle travel begins, the driver is likewise signaled. In response to safety-critical errors, the initializing of the braking system is broken off, and the parking brake is prevented from releasing. In the event of safety-critical operating states while the vehicle is in motion, it is also possible to intervene in the engine management system to reduce the available drive torque.

Using signal lines $z_1$ and $z_2$, respectively, the further components of the electromechanical braking system are initialized by the pedal module after the ignition is switched on, or in response to the actuation of the brake while the ignition is switched off, as well. In addition, a controlled shutdown of the system components is carried out when vehicle operation has ended using these signals.

Service interface $d_s$ makes it possible for service personnel to access the braking system and to read out the error storage means for the entire system.

Energy diagnostic unit (20) monitors the energy supply units (batteries) with respect to sufficient capacity for the output and energy necessary during braking processes. For this, at least the energy needed to achieve the minimum braking action specified by law must be guaranteed. Monitoring is accomplished by suitable sensors $L_1$ and $L_2$, for example, for measuring the charging current and the load current, and a mathematical model. This model takes into account the electro-chemical and physical properties, as well as the previous histories, e.g. the number of exhaustive discharges, of the energy supply units. The energy diagnostic unit is preferably implemented in the form of a redundant microcomputer system which is powered via two energy sources and whose subsystems are able to exchange data via an internal bus system.

Figure 3:
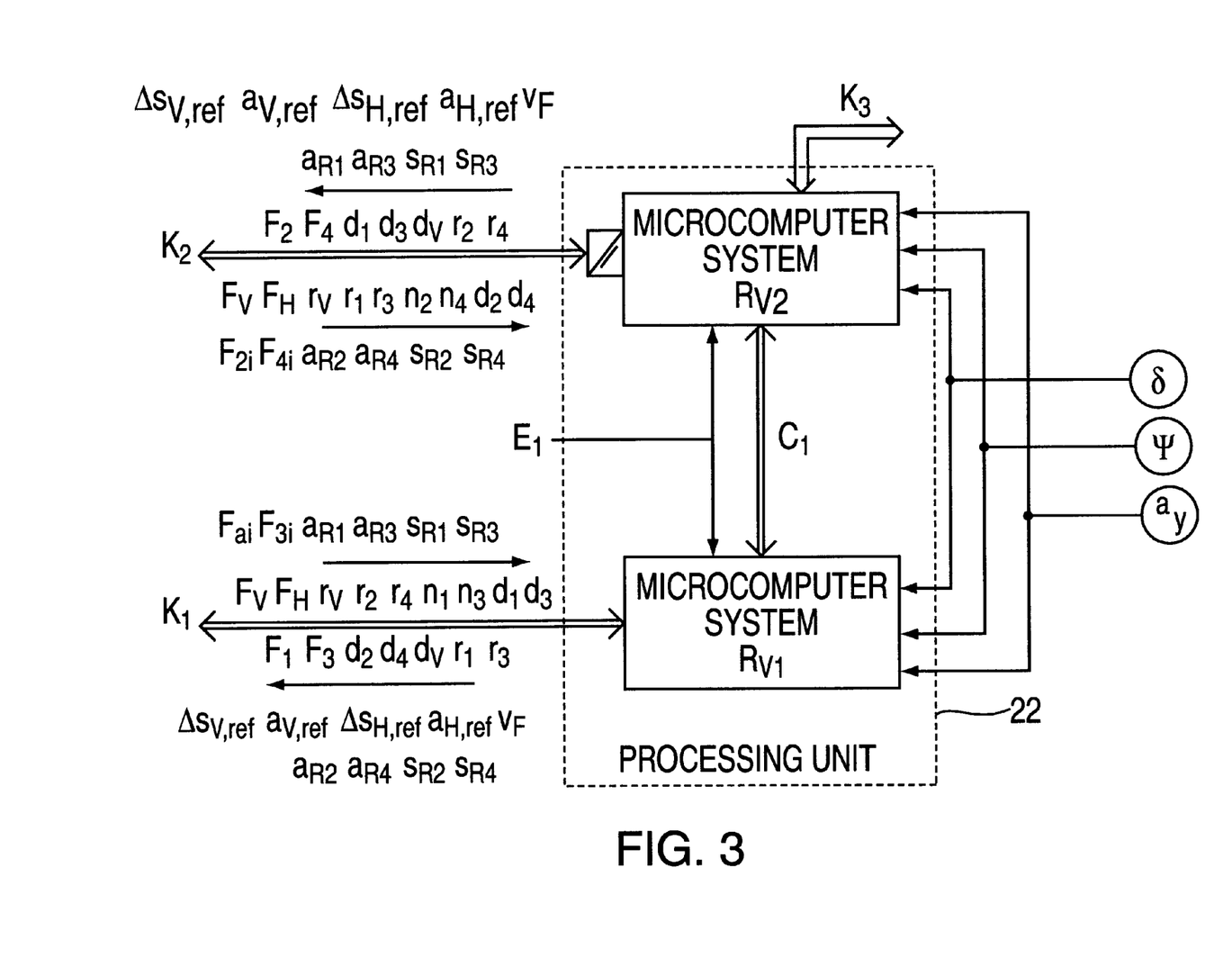
FIG. 3 shows a processing unit.

The higher-level functions of the braking system are implemented in processing unit (22). Among these are, in particular, the calculations of the wheel-individual command variables $F_1$, $F_2$, $F_3$ and $F_4$ for the application forces or braking torques of a wheel. The calculations are carried out, using known principles such as the consideration of the wheel specific rotational frequencies during full brakings along the lines of an anti-lock protection; consideration of a traction control function; implementation of an operating dynamics control for avoiding skid conditions, including further sensors, e.g. for steering-wheel angle $\delta_L$, transversal acceleration $a_y$ and yaw-angle speed $\psi$; consideration of the braking-pad thickness for each individual wheel during partial brakings with the goal of achieving uniform wear of the brake pads; implementation of a hill-holder function; consideration of the load state to achieve optimal braking-force distribution on the wheels of the front and rear axle; achievement of an adaptive braking-force distribution between the inner and outer wheels of an axle in a curve as a function of the measured steering angle, in order to achieve improved operating dynamics; corrections of the individual braking forces in response to the malfunction of a wheel unit; deliberate interventions in the engine management system in response to a braking input via communication system $K_3$; and intervention in the engine management system in the event of a safety-critical fault of the braking system. In addition, the measured actual values of controlled variables F1i, F2i, F3i and F4i are available to the processing unit for calculating command variables F1 through F4 for the individual wheels. Furthermore, operating-dynamics reference variables can optionally be ascertained for supporting the monitoring functions within the wheel units. Details are set forth in the description of the functions of the wheel unit.

As shown in FIG. 3, processing unit (22) is redundantly constructed using two microcomputer systems RV1 and RV2, which exchange calculated data via an internal communication channel C1. Via the two communication systems $K_1$ and $K_2$, processing unit (22) receives the wheel-individual rotational frequencies (n1 through n4) and the actual values of the application force or the braking torque (F1i through F4i) from wheel units (12 through 18), and receives the command variables for the application force or the braking torque for the wheels of front axle $F_v$ and for the wheels of rear axle $F_H$, respectively, from pedal unit (10).

In the event of a malfunction of one computer channel in pedal unit (10), the data transport via the connected communication system is interrupted. In response to this fault constellation, processing unit (22) transmits the axle-individual command variables Fv and FH received from the other computer channel of pedal module (10), as well as messages (r1 through r4) for the fallback strategies, to connected wheel units (12 through 18). In addition, given this fault, diagnostic messages (d1 through d4) of the wheel units are routed to the functional computer channel of the pedal module. Consider as an example the malfunction of microcomputer $P_2$ in the pedal module. In response to this error case, the messages of the pedal module can be transmitted via communication system $K_1$ and the processing unit to wheel modules 2 and 4. The diagnostic messages from wheel modules 2 and 4 take the reverse path. In addition, to calculate the wheel-individual command variables necessary for an operating-dynamics-control function, the requisite variables (steering angle, transversal acceleration and rate of rotation) are ascertained in processing unit (22).

The calculations indicated above are performed independently in both computer systems RV1 and RV2 and compared to one another. In response to inconsistent results, the processing unit is switched off and a fault-status message dvis dispatched via the communication system.

The application forces and braking torques for the individual wheels are controlled in closed loop within the wheel units. Communication systems $K_1$ and $K_2$ provide the command variables for this purpose.

The wheel units are powered by different electrical energy sources, wheel units 12 and 14 by energy source $E_1$ and wheel units 16 and 18 by energy source $E_2$. The wheel units are also connected to the other system modules by different communication systems. Wheel units 12 and 14 communicate via $K_1$ and wheel units 16 and 18 communicate via $K_2$.

Figure 4:
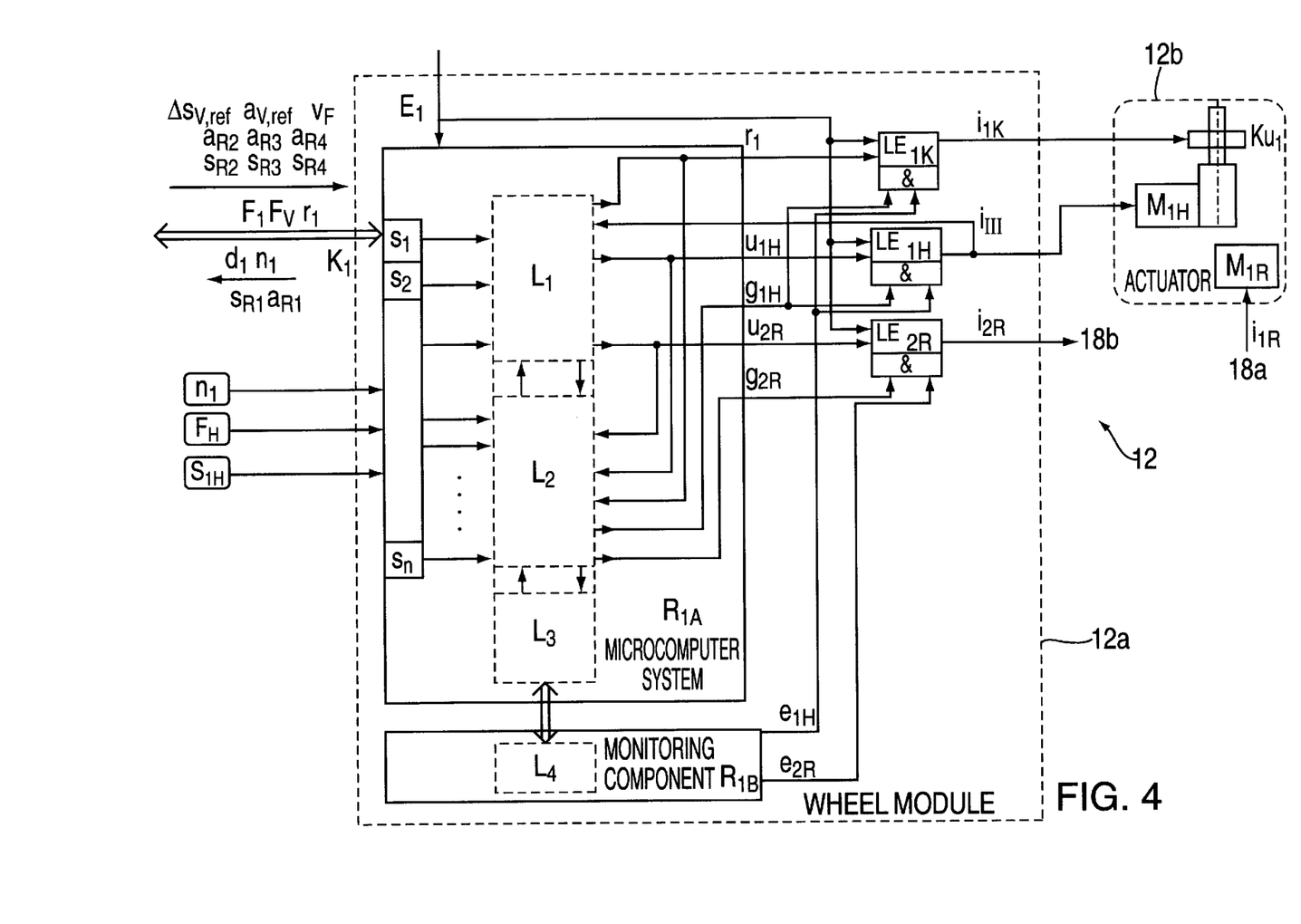
FIG. 4 shows a first exemplary structure of a wheel unit of the electromechanical braking system illustrated in FIG. 1.
Figure 5:
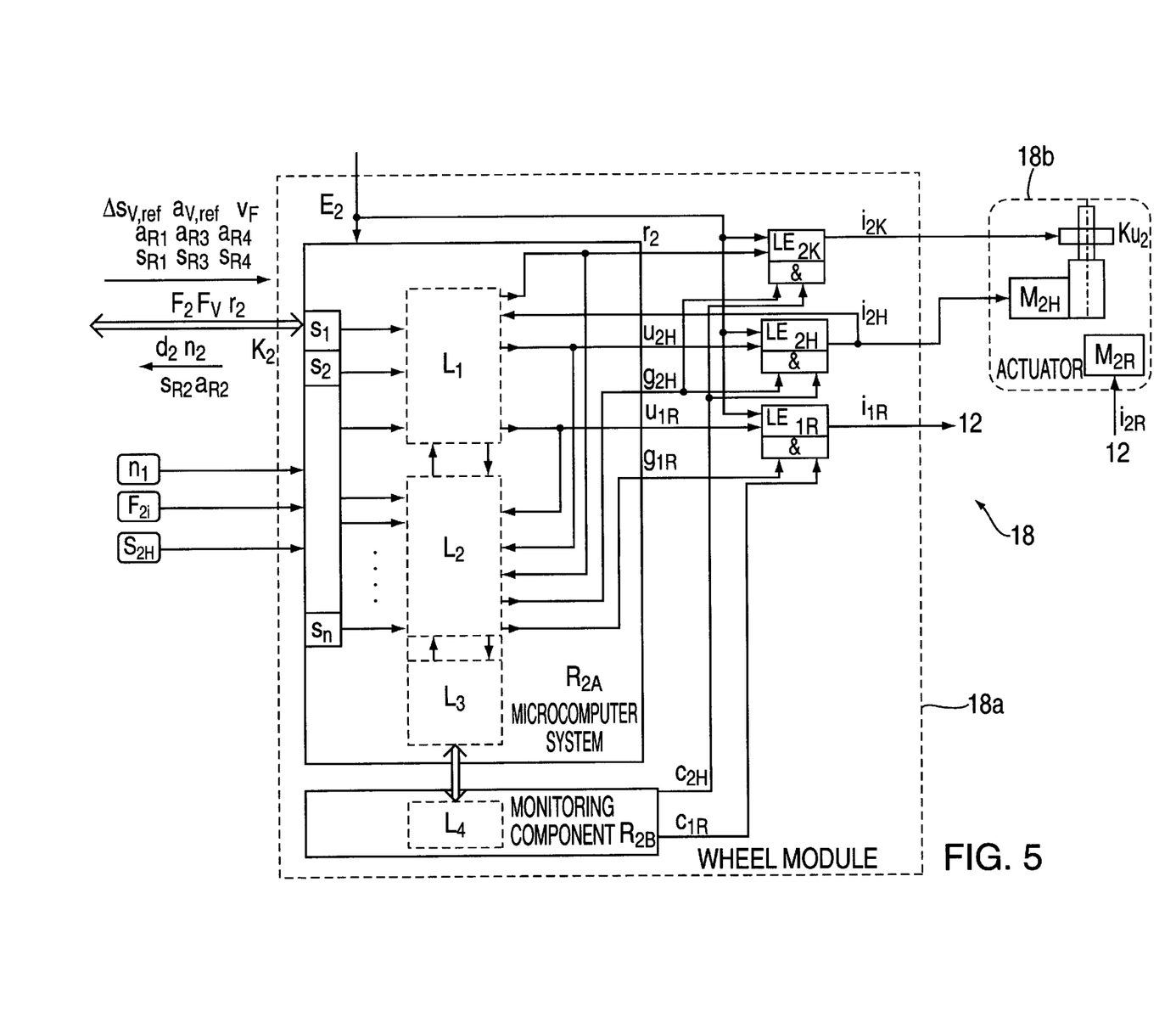
FIG. 5 shows a second exemplary structure of the wheel unit of the electromechanical braking system.

Wheel unit 12 shown in FIG. 4 is described below. The other wheel units are constructed in a corresponding manner. Wheel unit 12 is used for the closed-loop control of the application force or the braking torque of one wheel and for initiating a fallback strategy in response to a fault in actuator 18b of wheel unit 18. Wheel unit 12 communicates with the other system components via communication system $K_1$. The wheel unit receives the following variables via this system:

$F_1$: Wheel-individual command variables for the closed-loop control of the application force or of the braking torque of the wheel. This variable is provided by processing unit (22) at the instant of an ABS (i.e., an antilock braking system), ASR (i.e., a traction control system) or FDR (e.g., an operating dynamics control) intervention. In a further embodiment variant, this command variable could additionally be calculated by the processing unit specifically for the following tasks:
a) to achieve uniform wear of all the brake pads of a vehicle;
b) to adapt the distribution of the driver's overall braking-torque input on the wheels of the front and rear axle, respectively, as a function of the instantaneous axle-load distribution; and
c) to achieve an adaptive braking-force distribution between the inner and outer wheel of an axle in a curve as a function of the measured steering angle, in order to achieve improved operating dynamics.

$F_v$: Substitute command variable for the front axle for the application force or the braking torque of a front-axle wheel. (Substitute command variable $F_H$ is used correspondingly for the wheel units allocated to the rear axle.) Command variable $F_v$ is formed from the service-brake and parking-brake input of the driver and is provided to the two wheel units of the front axle as well as to the processing unit. The axle-specific command variable is used within a wheel unit for the closed-loop control of the braking force or of the braking torque, provided that no differing wheel-individual command variable has been formed in the processing unit, or also in the event of a malfunction of the processing unit.

$r_1$: Control message for initiating a modified processing sequence in the wheel unit. This message is formed by the pedal unit or the processing unit from the received error signal messages of the connected system modules.

The signals received via the communication system are stored redundantly in storage cells $S_i$ of microcomputer system $R_{1A}$. In other embodiments, the following signals received via communication system $K_1$ can also be processed for monitoring the functioning of the wheel unit:

$a_{R2}$, $a_{R3}$, $a_{R4}$: decelerations of the other wheels $a_{v,ref}$: reference value for the deceleration difference of the wheels of the front axle $s_{R2}$, $s_{R3}$, $s_{R4}$: slippage of the other wheels $\Delta s_{v,ref}$: reference value for the slippage difference between the wheels of the front axle $v_F$: estimated value for the vehicle velocity.

The following signals are fed as output variables of the wheel unit via communication system $K_1$ to the connected system modules:

$n_1$: preprocessed rotational-frequency signal of the allocated wheel $d_1$: cyclical error-signal message of the wheel unit f1i: measured actual value of the controlled variable In addition, in variants of the embodiment, the following variables are also needed by wheel unit 12 for monitoring functioning in the other wheel units:

$a_{R1}$: deceleration of the allocated wheel $s_{R1}$: slippage of the allocated wheel The signals are provided via communication system $K_1$ to the other system modules.

Wheel unit 12 includes the following components:
a) microcomputer system $R_{1A}$ having the associated interface, storage, and watchdog modules;
b) monitoring component $R_{1B}$;
c) electric motor $M_{1H}$, including the necessary gear stage for converting the rotational movement into an adjustment movement of the brake pad of a disc or drum brake;
d) electromagnetically vented disengaging device $K_{u1}$, which engages with a shaft lying within the flow of torque between the electric motor and the brake pad, and which, in the currentless state, is closed by a spring element, and in this state, maintains the prevailing angular position of the shaft. The design of this disengaging device must ensure that any input application force on the brake disc can be maintained;
e) resetting module $M_{1R}$, implemented in the form of an electromagnetically operable disengaging device or as an electric motor. This module is powered by energy source $E_2$ and is driven by wheel unit 18;

f) power electronics $LE_{1H}$ for driving electric motor $M_{1H}$;

g) power electronics $LE_{1K}$ for driving electromagnetically operable disengaging device $Ku_1$;

h) power electronics $LE_{2R}$ for driving resetting module $M_{2R}$ which is integrated in wheel unit 18.

Items c), d) and e) will hereinafter be referred to as actuator 12b of wheel unit 12.

The following input signals deriving from the allocated wheel are fed via peripheral input modules to microcomputer system $R_{1A}$ and redundantly stored in storage cells $S_1$: wheel rotational frequency $n_1$, actual value $F_{1i}$ for the wheel application force or the wheel braking torque, the brake application stroke or the rotational angle $s_{1H}$ of the gear stage or of the electric motor and optionally the motor current $i_{1H}$ of the actuator.

Within microcomputer $R_{1A}$, first of all, command variable $F_{1F}$ is selected from variables $F_1$ and $F_v$, respectively, received cyclically via the communication channel. Using prevailing measured actual value $F_{1i}$ for the wheel application force or for the wheel braking torque, system deviation $x_{d1}$ is formed therefrom according to $$x_{d1}(t)=F_{1F}(t)-F_{1i}(t) \qquad (1)$$

With limiting values $\epsilon$ and $\mu$ to be predefined, and time intervals $T_\epsilon$ and $T_\mu$, the comparisons can then be carried out in accordance with $$|x_{d1}(t)|\leq\epsilon \text{ for } 0<t<T_\epsilon \qquad (2)$$

$$|d\, x_{d1}(t)/dt|\leq\mu \text{ for } 0<t<T_\mu \qquad (3)$$

If conditions (2) and (3) are met, no corrective interventions whatsoever are carried out at the actuator. If this condition is not met, then the active manipulated variable necessary for adjusting the wheel application force or the wheel braking torque is calculated using a digital control algorithm, taking into consideration the most recently output manipulated variable (for example, of a proportional-integral controller or of a proportional-integral-derivative controller). This manipulated variable is output in the form of PWM signal $u_{1H}$ to power electronics $LE_{1H}$. In addition, electromagnetically vented disengaging device $Ku_1$ is activated by way of control signal $f_1$ and power electronics $LE_{1K}$, this being the prerequisite for enabling a rotational movement of the motor to achieve a change in the wheel application force. If conditions (2) and (3) are met during the adjustment of the application force or of the wheel braking torque, then activation of electromagnetically operable disengaging device $Ku_1$ is terminated, and electric motor $M_{1H}$ is subsequently switched to the currentless state. In order to avoid an unwanted change in the wheel application force because of a malfunction of microcomputer system $R_{1A}$, activation of the electric motor by current $i_{1H}$ is only made possible if enabling signal $g_{1H}$ and, additionally, enabling signal $e_{1H}$ of monitoring component $R_{1B}$ are applied to the activation section of power electronics $LE_{1H}$ (e.g., AND-operation in $LE_{1H}$).

In order to also be able to avoid an unwanted decrease of the wheel application force maintained by the disengaging device, the activation of disengaging device $Ku_1$ by current $i_{1K}$ is only possible when both enabling signal $g_{1H}$ and enabling signal $e_{1H}$ are made available by monitoring component $R_{1B}$ (e.g., AND-operation in $LE_{1K}$). By including the electromagnetic disengaging device in the control process, in response to an approximately steady-state braking input of the driver, the necessary application force can initially be applied via the electric motor, and subsequently can be maintained solely by the spring forces within the electromagnetically operable disengaging device, without the consumption of electrical energy. Thus, the application forces necessary in response to the actuation of the parking brake of the motor vehicle can be introduced in a simple manner and maintained without energy. To release the brake at a wheel, first the disengaging device is opened by activation signal $f_1$, and thereupon, electric motor $M_{1H}$ is activated by negative voltage. If this release is prevented by a fault in the actuator suite, for example, because the gear stage in the actuator suite has jammed, then this error can be clearly recognized from the measured wheel application force or wheel braking torque. This is done, for example, by comparing the activation input to the wheel rotational frequency, optionally to the rotational angle. Jamming is recognized when, for example, in spite of activation, no change is recognized in the rotational angle of the electric motor, and/or if there is brake slippage of the allocated wheel in the absence of activation. The closed-loop control is thereupon broken off, and an error message $d_1$ is dispatched via the communication system. This message is evaluated in pedal unit (10), and as a result, an error-rectification measure is initiated. With the assistance of a fallback message $r_2$, sent via communication system $K_2$, wheel unit 18 shown in FIG. 5 receives the information to activate resetting device $M_{1R}$ in actuator suite 12b by way of power electronics $LE_{1R}$ and signal $i_{1R}$. Since resetting device $M_{1R}$ is activated by energy source $E_2$, a release of the braking function of the wheel allocated to wheel unit 12 can even be carried out in the event of a failure of energy source $E_1$.

There is a corresponding reaction in wheel unit 12 to a fallback message $r_1$ which contains the information to release the wheel, allocated to wheel unit 18, which was braked due to a fault situation. This type of message leads to the output of signal $u_{2R}$ which activates power electronics $LE_{2R}$. However, control signal $i_{2R}$ for addressing the resetting device in actuator 18b is only actuated if enabling signals $g_{2R}$ and $e_{2R}$ are provided (e.g., AND-operation in $LE_{2R}$).

The accuracy of the measured actual value of the wheel application force or of the wheel braking torque can be ensured by an analytical redundancy. In one implementation of the present invention, this redundancy can be effected by one or more of the following measures:

Comparing the actual values of the wheel braking force or the wheel braking torque to a reference variable $F_{r,a}$. To determine $F_{r,a}$, first the change of position or rotational-angle measured variable $s_{1H}$ is measured from the instant of the start of braking, and with the assistance of a function defined in the design, subsequently converted to the physical dimension of a force or a torque. This function takes into consideration all elasticities of the components arranged in the force flux of the actuator. In the case of the closed-loop control of the wheel braking torque, a temperature-dependent friction model of the brake disc (e.g., modeling of the heating and cooling of the disc) is also implemented in the function.

Comparing the actual value of the wheel application force or the wheel braking torque to a reference variable $F_{r,b}$. To determine $F_{r,b}$, the current of electric motor $M_{1H}$ is measured during a steady-state braking phase and, with the assistance of a predefined function, is converted to the physical dimension of a force or a torque. This function takes into consideration, first of all, the design data of the electric motor and of the gear, optionally including a temperature and friction model. Also taken into consideration are the prevailing, effective input voltage and the direction of rotation before reaching the steady-state working point. In the case of the closed-loop control of the wheel braking torque, a temperature-dependent friction model of the brake disc can also be implemented in the function.

A further method is based on the comparative observation of the deceleration of the wheels in the partial-braking range. The calculation of the wheel decelerations in the individual wheel units is initiated by a message from the processing unit at instant $T_x$. The deceleration of the wheel allocated to wheel unit 12 is calculated according to the equation $$a_{R1}(T_x) = C_1[n(T_x) - n(T_x - T_a)] \quad (4)$$

Here, $T_a$ is the cyclical sampling time during which the rotational frequency is ascertained at each wheel unit, and $C_1$ is a constant defined by the wheel geometry and the sampling time.

The deceleration difference $\Delta a_v(T_x)$ of the front-axle wheels is formed from the deceleration values of the wheels of front axle $a_{R1}(T_x)$ and $a_{R2}(T_x)$:

$$\Delta a_v(T_x) = a_{R1}(T_x) - a_{R2}(T_x) \quad (5)$$

Value $a_{R2}(T_x)$ necessary for this purpose is supplied by wheel unit 18 via communication system $K_1$. If the closed-loop application-force or braking-torque control is functioning correctly, the following must be true for deceleration difference $\Delta a_v(T_x)$:

$$|\Delta a_v(T_x) - \Delta a_{v,ref}(T_x)| < \epsilon_a \quad (6)$$

Here, $\Delta a_{v,ref}$ is a reference value for the deceleration difference of the wheels of the front axle. $\epsilon_a$ describes a parameterizable fault limiting value. Reference value $\Delta a_{v,ref}$ is calculated in the processing unit with a mathematical model, using the cyclically acquired operating-dynamics measured variables of steering-wheel angle $\delta_L$, transversal acceleration $a_y$, and yaw-angle speed $\psi$, and taking into account an estimated value for vehicle velocity $v_F$. If condition (6) is violated, then a fault can be inferred in the application-force or braking-torque sensor of one of the wheels. The use of both wheels of an axle for detecting faults eliminates the influence of disturbance variables which act on both wheels. In this method, it is assumed that the functionality of the control algorithm and of the manipulated-variable output, as well as the error-free detection of the rotational frequencies at both wheels of the front axle are ensured by other monitoring methods. The allocation of a recognized fault to wheel unit 12 or wheel unit 18 is effected by including the two wheel-deceleration values of the rear axle $a_{R3}(T_x)$ and $a_{R4}(T_x)$ (e.g. by comparing the individual variable to the corresponding variable of a rear wheel).

A further method is based on the comparative consideration of the slippage values of the individual wheels in the partial-braking range. The calculation of the slippage in the individual wheel units is initiated by a message from the processing unit at instant $T_x$. Within wheel unit 12, the slippage of the allocated wheel, along with wheel rotational frequency $n_1$ and the estimated value of vehicle velocity $v_F$, is calculated according to the equation $$s_{R1}(T_x) = 1 - C_2 n_1(T_x)/V_F(T_x) \quad (7)$$

Constant $C_2$ is determined by the wheel geometry. Using wheel slippage $s_{R2}(T_x)$, which is supplied by wheel unit 18 via the communication system, the slippage difference of the wheels of front axle $\Delta s_v$ can be calculated according to $$\Delta s_v(T_x) = s_{R1}(T_x) - s_{R2}(T_x) \quad (8)$$

If the closed-loop application-force or braking-force control is functioning correctly, the following must be true for slippage difference $\Delta s_v(T_x)$ $$|\Delta s_v(T_x) - \Delta s_{v,ref}(T_x)| < \epsilon_s \quad (9)$$

Here, $\Delta s_{v,ref}$ is a reference value for the slippage difference of the wheels of the front axle. $\epsilon_s$ describes a parameterizable fault limiting value. Reference value $\Delta s_{v,ref}$ is calculated in the processing unit with a mathematical model of the operating dynamics, using the cyclically acquired measured variables of steering-wheel angle $\delta_L$, transversal acceleration $a_y$, and yaw-angle speed $\psi$, and taking into account the wheel-individual command variables for the application forces or wheel braking torques:

$$\Delta s_{v,ref}(T_x) = f_1\{\delta_L, a_y, \Psi, F_1, F_2, F_3, F_4\} \quad (10)$$

In a further variant of the embodiment, an improved reference variable $\Delta s_{v,ref}$ can be ascertained, by including measured or estimated values for wheel loads $F_{N1}$, $F_{N2}$, $F_{N3}$ and $F_{N4}$. To that end, $\Delta s_{v,ref}$ is formed in the processing unit using an expanded dynamic model. In this manner, influences caused by a shift in the wheel load are taken into consideration during the calculation. If condition (9) is violated, then a fault can be inferred in the application-force or braking-torque sensor of one of the wheels. In this context, it is assumed that the functionality of the control functions, as well as the error-free detection of the rotational frequencies at both wheels of the front axle are ensured by other monitoring methods. The allocation of a recognized fault to wheel unit 1 or wheel unit 2 is effected by including the two slippage values $s_{R3}(T_x)$ and $s_{R4}(T_x)$ for the wheels of rear axle (e.g., by comparing the individual variable to the corresponding variable of a rear wheel).

The monitoring concept of the wheel module is structured with the four logic levels $L_1$, $L_2$, $L_3$ and $L_4$ and two hardware levels. Microcomputer system $R_{1A}$ and monitoring component $R_{1B}$ operate in the hardware levels.

Monitoring component $R_{1B}$ communicates with microcomputer system $R_{1A}$ by an internal bus system. The monitoring component is used to check the computing capability of this microcomputer system and to monitor program runs within the computer. A mutual monitoring of these components is made possible by the selected type of data communication between microcomputer system $R_{1A}$ and monitoring component $R_{1B}$. For that purpose, the following tasks are assigned to the logic levels:

A level 1 is implemented in microcomputer system $R_{1A}$. It assumes the following tasks: calculating the control function for the activation of electric motor $M_{1H}$; activation of electromagnetically operable disengaging device $Ku_1$; activation of resetting module $M_{2R}$; calculations for checking the accuracy of the measured actual value of the wheel application force or wheel braking torque $F_{1i}$ by the analytical redundancy described.

A level 2 is likewise integrated into microcomputer $R_{1A}$. This level checks the accuracy of the calculations carried out in level 1, using algorithms which are of a different nature from those in level 1. In addition, the input data stored redundantly in storage cells $S_i$ are used to perform the calculations, so that errors due to corrupt memory contents are recognized. The functioning of the controller is checked by a parallel-connected, mathematical model of the controller, which is calculated using the redundantly stored data for alternative command variables $F_1$ and $F_v$, respectively, and with the actual value of the wheel application force or wheel braking torque $F_{1i}$. An error condition is recognized in response to significant deviations between the model output variable and the calculations performed in level 1. In addition, the correct functioning of the controlled system is checked in level 2. Used for that purpose is a mathematical model of the controlled system which describes the dynamic correlation between the manipulated variable and controlled variable $F_{1i}$, also including disturbance variables. The manipulated variable calculated in the control algorithm in level 1 is supplied to this model. An error condition is recognized in response to significant deviations between the model output variable and the measured actual value of the wheel application force or wheel braking torque $F1_i$. Activation signals $f_1$ for the electromagnetically vented disengaging device and $u_{2R}$ for the resetting module, respectively, are likewise checked for correctness in level 2 and fault conditions are optionally recognized. The models utilized are derived from the physical correlations.

In response to faults recognized in level 3, as well as in level 2, the appertaining enabling signals $g_{1H}$ and $g_{2R}$, respectively, are reset, and an error message $d_1$ is transmitted via communication system $K_1$.

Level 3 is implemented in microcomputer $R_{1A}$. To ensure safe functioning of the wheel unit in the event of a computer or program error, in a fault situation, the programs in levels 1 and 2 must nevertheless still run properly, or the run which is not proper must be reliably recognized. In the embodiment variant presented, the control is effected by a query-response communication of levels 3 and 4. Microcomputer system $R_{1A}$ collects a query from the monitoring computer and responds to it within a predefined time interval, in each case taking into account all safety-relevant program sections. A query can only be answered correctly if the programs for the computer functional performance test and the command test are executing in fault-free manner. The partial responses formed from the partial programs are combined to form a complete response and supplied to level 4 in the monitoring component.

This level is implemented in the monitoring component. Here, the entire response provided by microcomputer $R_{1A}$ is checked with respect to the time interval of arrival and for the bit-for-bit agreement with the correct response matching the query. If the query-response communication with level 3 is not proceeding properly, enabling signals $e_{1H}$ and $e_{2R}$, respectively, are interrupted in monitoring component $R_{1B}$.

Figure 6:
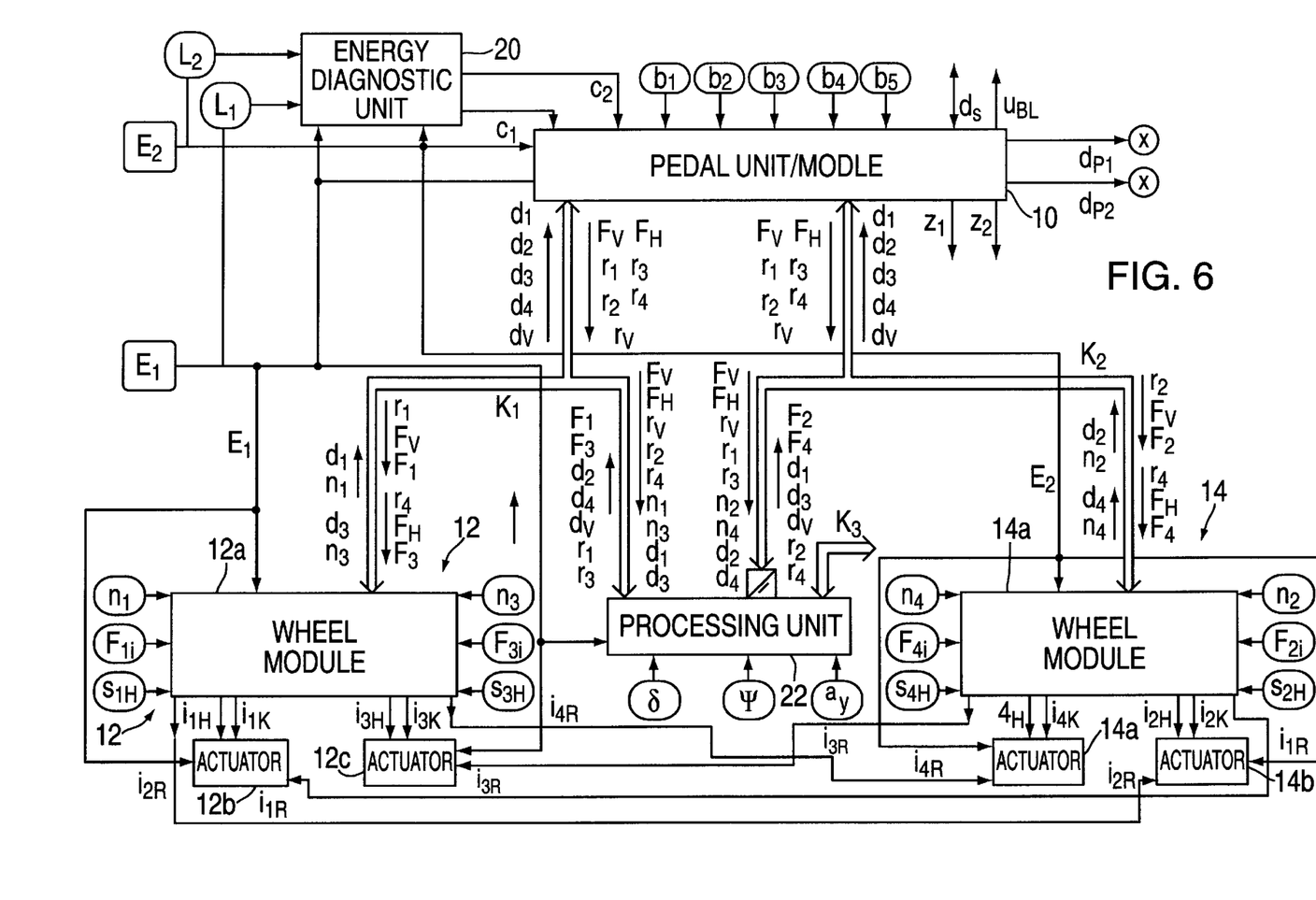
FIG. 6 shows a second exemplary embodiment of the electromechanical braking system.

In another embodiment (e.g., embodiment 2) the functions of two wheel units of a diagonal or of an axle are integrated into one wheel-pair unit according to the previous explanations. The structure of this embodiment variant of the electromechanical braking system is shown in FIG. 6.

Figure 7:
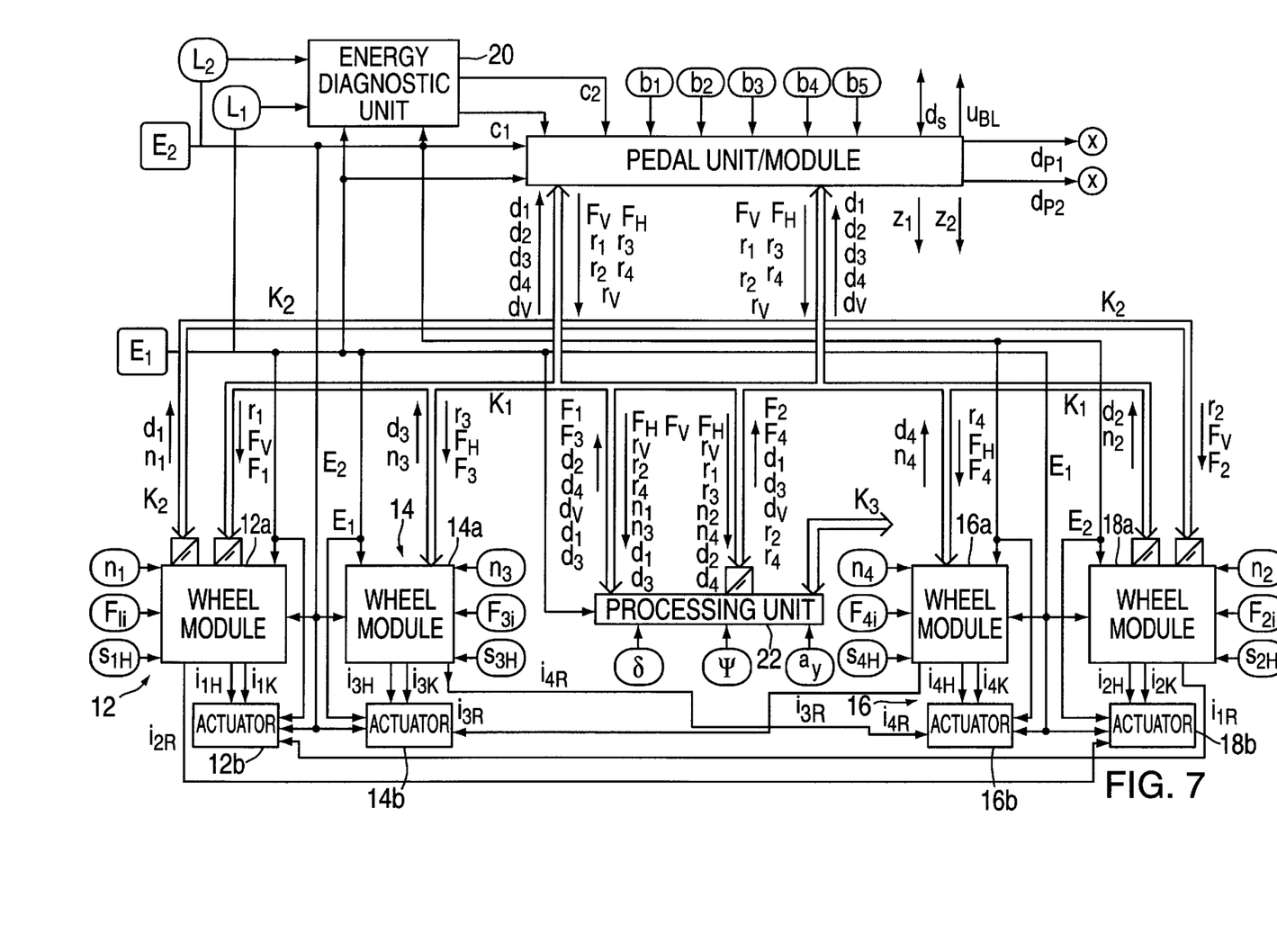
FIG. 7 shows a third exemplary embodiment of the electromechanical braking system.
Figure 8:
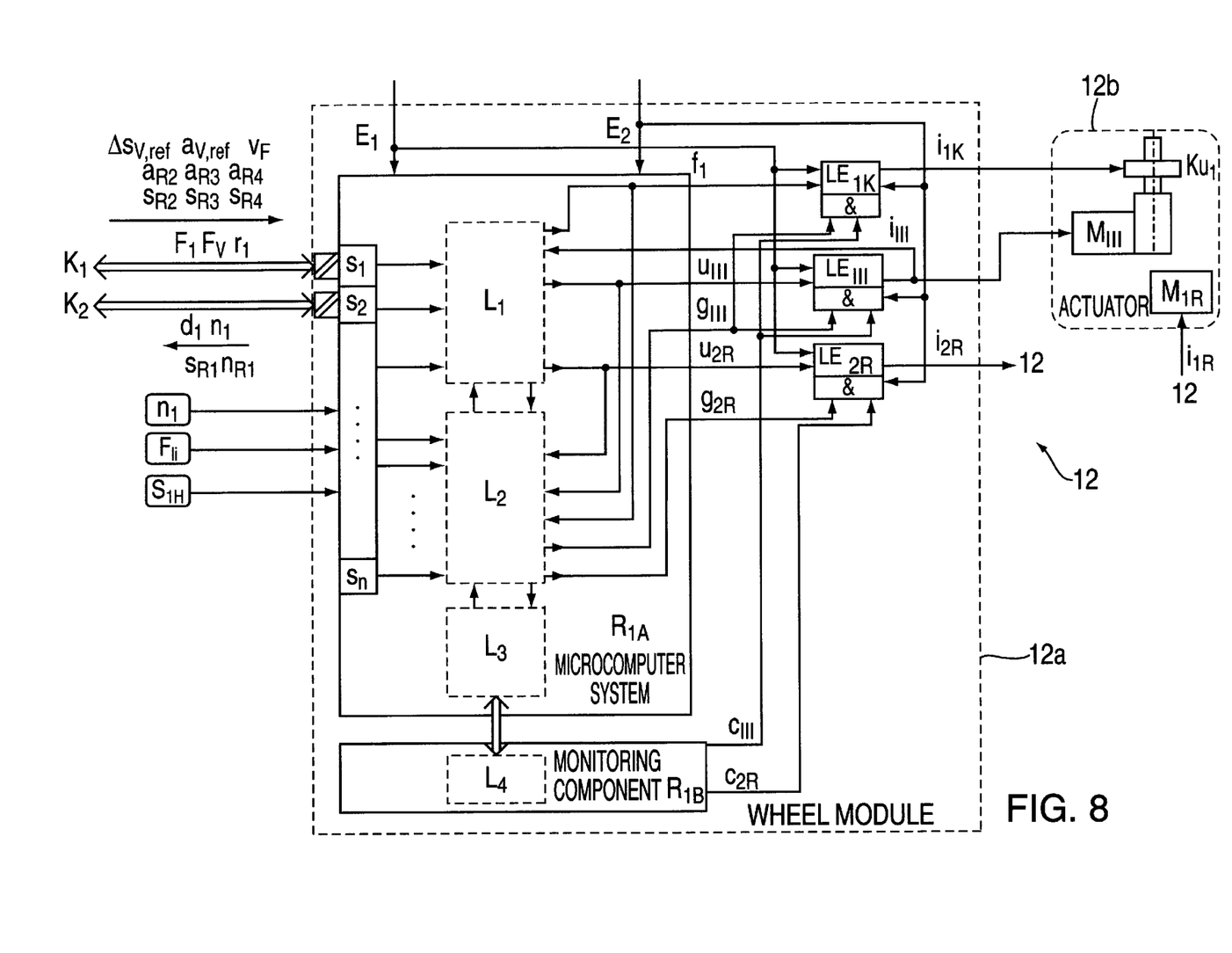
FIG. 8 shows a third exemplary structure of the wheel unit of the third exemplary embodiment illustrated in FIG. 7.

In embodiments 1 and 2 of the electromechanical braking system, in the event of the failure of one energy supply or of one of communication systems $K_1$ and $K_2$, respectively, it is usually the case that two wheels are no longer ready for braking. This disadvantage is avoided in embodiment variant 3. The structure of this embodiment is shown in FIG. 7 and its wheel unit is shown in FIG. 8. This embodiment differs from the embodiment 1 especially in that the wheel modules of the front wheels are each connected by redundant communication systems $K_1$ and $K_2$ to the other system modules, and the wheel modules of the front wheels are powered by both energy sources.

The functions described are implemented by corresponding programs which run in the corresponding computer.

The measures for forming the setpoint values in the pedal unit are also used in other electrical braking systems, e.g., in electro-hydraulic or electro-pneumatic braking systems.

APPENDIX

List of Designations $a_{R1}$, $a_{R2}$, $a_{R3}$, $a_{R4}$: Decelerations of the wheels $a_{v,ref}$, $a_{H,ref}$: Reference value for the deceleration difference of the wheels of the front and rear axle, respectively $a_y$: Transverse acceleration $b_1$, $b_2$, $b_3$: Measuring signals of the driver's input (e.g. brake-pedal angle)

$b_4$, $b_5$: Measuring signals of the parking-brake input $b_{B,rep,1}$ $b_{B,rep,2}$: Reference values for the service-brake input $b_{F,rep,1}$ $b_{F,rep,2}$: Reference values for the parking-brake input C: Internal communication system $C_1$, $C_2$: Diagnostic signals of the load state of the energy-supply devices d: Activation signal of a diagnostic unit $d_{P1}$, $d_{P2}$: Status messages concerning the state of the electromechanical braking system $d_s$: Service interface in the pedal module $d_v$: Error signals of the processing unit $d_1$, $d_2$, $d_3$, $d_4$: Error messages of the wheel units $E_1$ $E_2$: Energy supply $e_{1H}$, $e_{2H}$, $e_{3H}$, $e_{4H}$: Logical activation signal for the power electronics of a wheel unit $e_{1R}$, $e_{2R}$, $e_{3R}$, $e_{4R}$: Logical activation signal for the power electronics of the resetting device of a wheel unit $F_{B,res,1}$, $F_{B,res,2}$: Command variable for the total force of the service brake $F_{res}$: Command variable for the driver's braking-force input $F_H$: Command variable for the application force (or the wheel braking torque) for the wheels of the rear axle $F_F$: Command variable for the parking-brake force $F_{F,res,1}$ $F_{F,res,2}$: Command variable for the total force of the parking brake $F_H$: Command variable for the application force (or the wheel braking torque) for the wheels of the rear axle $F_1$, $F_2$, $F_3$, $F_4$: Wheel-individual command variable for the wheel braking force or the wheel braking torque $F_{1F}$, $F_{2F}$, $F_{3F}$, $F_{4F}$: Selected wheel-individual command variable for the wheel application force or wheel braking torque $F_{1i}$ $F_{2i}$ $F_{3i}$ $F_{4i}$: Actual value for the wheel braking force or wheel braking torque $f_1$, $f_2$, $f_3$, $f_4$: Activation signal for the electromagnetic clutch in a wheel unit $g_{1H}$, $g_{2H}$, $g_{3H}$, $g_{4H}$: Logical activation signal for the power electronics in a wheel unit $g_{1R}$, $g_{2R}$, $g_{3R}$, $g_{4R}$: Logical activation signal for the power electronics of the resetting device in a wheel unit $i_{1K}$, $i_{2K}$, $i_{3K}$, $i_{4K}$: Current for activating an electromagnetic disengaging device in a wheel unit $i_{1H}$, $1_{2H}$, $i_{3H}$, $i_{4H}$: Current for activating the electric motor in a wheel unit $i_{1R}$, $i_{2R}$, $i_{3R}$, $i_{4R}$: Current for activating the resetting device in a wheel unit $K_1$, $K_2$, $K_3$: Communication devices $LE_{1H}$ $LE_{2H}$ $LE_{3H}$ $LE_{4H}$: Power electronics for activating the electric motor $LE_{1K}$ $LE_{2K}$ $LE_{3K}$ $LE_{4K}$: Power electronics for activating the electromagnetically operable disengaging device $LE_{1R}$ $LE_{2R}$ $LE_{3R}$ $LE_{4R}$: Power electronics for activating the resetting device $L_1$, $L_2$: Sensor suite for determining the charge condition of an energy supply $n_1$ $n_2$ $n_3$ $n_4$: Measured values for wheel rotational frequencies $P_1$, $P_2$: Microcomputer in the pedal module $P_3$: Monitoring component in the pedal module $r_1$, $r_2$, $r_3$, $r_4$: Control signals for initiating a modified processing sequence in the wheel units $S_{H1}$, $S_{H2}$, $S_{H3}$, $_{SH4}$: Brake application stroke of the brake disc or brake drum, or the rotational angle of the electric motor or of the gear stage $S_{R1}$, $S_{R2}$, $S_{R3}$, $S_{R4}$: Slippage of the wheels $s_1$ through $S_n$: Storage cells in the wheel modules $U_1$, $U_2$: Input interfaces of the wheel unit $U_{BL}$: Activation signal for the brake light $u_{1H}$, $u_{2H}$, $u_{3H}$, $u_{4H}$: Activation signal for the power electronics of the electric motor in the wheel unit $u_{1R}$, $u_{2R}$, $u_{3R}$, $u_{4R}$: Activation signal for the power electronics of the resetting device in the wheel unit $V_F$: Estimated values of the vehicle velocity $X_{d1}$, $X_{d2}$, $X_{d3}$, $X_{d4}$: System deviation in a wheel unit $Z_1$, $Z_2$: Signal for initializing and deactivating the components of the braking system $\delta_L$: Steering angle $\psi$: Yaw-angle speed $\Delta S_{V,ref}$, $\Delta S_{H,ref}$: Reference value for the slippage difference between the wheels of the front and rear axle, respectively

What is claimed is:

1. An electrical braking system for a motor vehicle, comprising:
    a controller performing the following:
        detecting a first actuation of a service-brake operator element of the motor vehicle,
        determining at least one first input for a brake control as a function of the first actuation,
        detecting a second actuation of a parking-brake operator element of the motor vehicle,
        determining at least one second input of a driver as a function of the second actuation, and
        linking the at least one first input and the at least one second input to form a total braking input; and
    control units receiving at least one setpoint value of the total braking input, and controlling wheel brakes of the motor vehicle as a function of the at least one setpoint value.

2. The braking system according to claim 1, wherein the controller forms the total braking input by selecting a first maximum value for the first actuation and the second maximum value for the second actuation.

3. The braking system according to claim 1, wherein the controller redundantly detects at least one actuation signal of the parking-brake operator element.

4. The braking system according to claim 3, wherein the controller forms a representative signal value from the at least one actuation signal, the representative signal value having a maximum value when the motor vehicle is motionless, the representative signal value having a minimum value when the motor vehicle is in motion.

5. The braking system according to claim 1, wherein the controller includes at least two microcomputers which redundantly calculate the at least one second input as redundant signals.

6. The braking system according to claim 5, wherein at least one of the microcomputers retrieves the redundant signals and transmits the redundant signals to another one of the microcomputers.

7. The braking system according to claim 5, wherein each of the microcomputers determines a representative signal value, and wherein one of the microcomputers determines one of a braking-force value and a braking-torque value as a function of the representative signal value, and transmits the one of the braking-force value and the braking-torque value to another one of the microprocessors.

8. The braking system according to claim 5, wherein the microcomputers determine an accuracy of the at least one second input by comparing values of the at least one second input to the redundant signals.

9. The braking system according to claim 5, wherein the controller includes a monitoring component which checks a performance reliability of the microcomputers for an operational-sequence control.

10. The braking system according to claim 1, further comprising:
    a processor connected to the controller, the processor determining wheel-individual setpoint values for the control units which are allocated to the wheel brakes as a function of the at least one setpoint value,
    wherein, if a fault is detected in a computer channel of the controller, the processor transmits axle-individual preset variables of the computer channel to the control units which are connected to the controller.

* * * * *